United States Patent [19]
Klinkhart et al.

[11] Patent Number: 5,778,828
[45] Date of Patent: Jul. 14, 1998

[54] PROTECTIVE PET COLLAR

[75] Inventors: Roger Dell Klinkhart, San Dimas; Herman O. Klinkhart, Upland; Kenneth W. Bowman, Diamond Bar, all of Calif.

[73] Assignee: Ejay International Inc., Glendora, Calif.

[21] Appl. No.: 549,327

[22] Filed: Oct. 27, 1995

[51] Int. Cl.⁶ ................................................ A01K 27/00
[52] U.S. Cl. ................................................ 119/815; 602/18
[58] Field of Search ........................... 119/815, 855, 119/856, 860, 863, 865; 602/18, 21, 64

[56] References Cited

U.S. PATENT DOCUMENTS

| | | | |
|---|---|---|---|
| D. 188,302 | 6/1960 | Monfardini | 602/18 X |
| 439,598 | 10/1890 | Huntoon et al. | |
| 1,456,706 | 5/1923 | Murray | |
| 3,916,885 | 11/1975 | Gaylord, Jr. | 602/18 |
| 4,215,687 | 8/1980 | Shaw | 602/64 X |
| 4,286,547 | 9/1981 | Newbauer et al. | 119/815 |
| 4,413,588 | 11/1983 | Lindholm | 119/863 X |
| 4,719,876 | 1/1988 | Wilken | 119/815 |
| 4,827,915 | 5/1989 | Gorsen | 602/18 |
| 5,307,764 | 5/1994 | Moy | 119/815 |

Primary Examiner—Robert P. Swiatek
Assistant Examiner—Elizbeth Shaw
Attorney, Agent, or Firm—Thomas I. Rozsa; Tony D. Chen

[57] ABSTRACT

A protective pet collar has two sheets of flexible material fastened around an animal's neck for preventing the animal from bending its neck and thereby biting or licking an affected injured area of its body. The protective pet collar has a width adjustment so that the pet collar can easily be adjusted to accommodate different lengths of the necks of different animals.

27 Claims, 3 Drawing Sheets

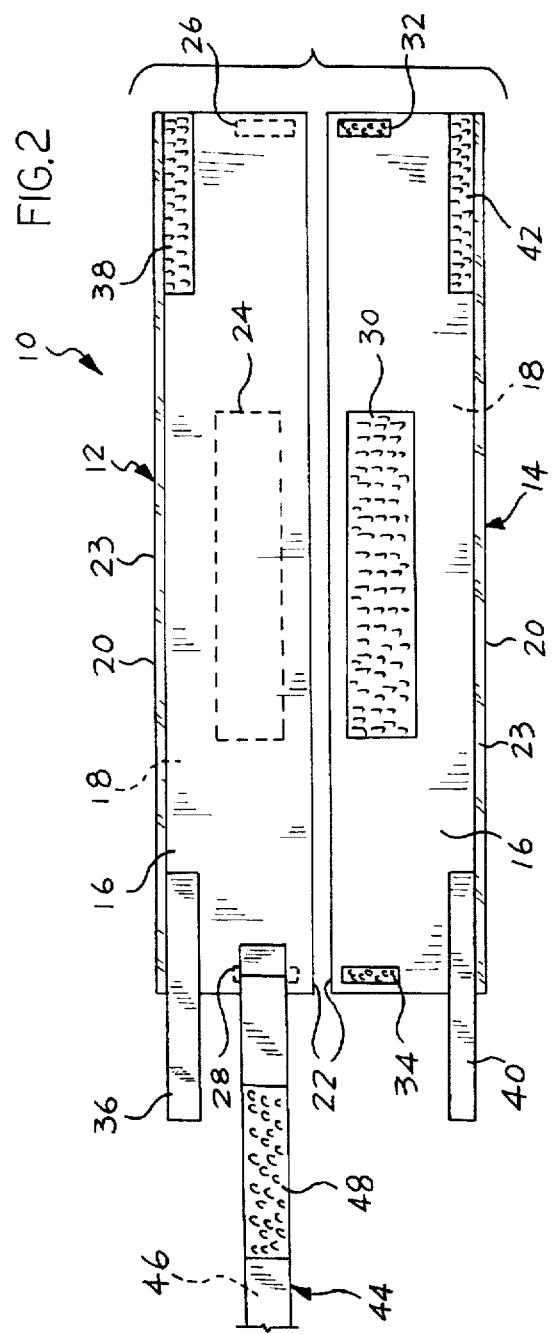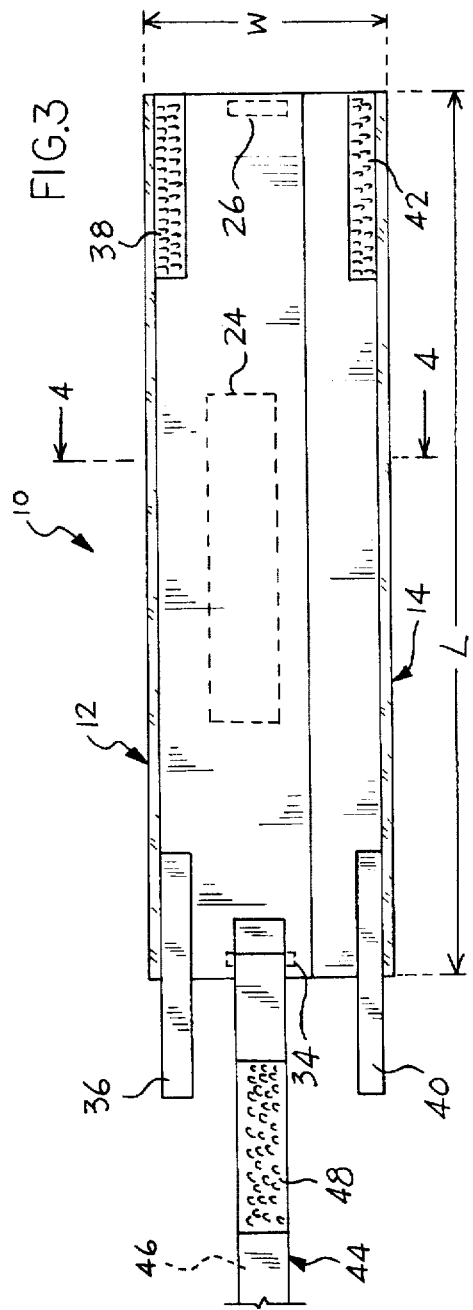

PROTECTIVE PET COLLAR

BACKGROUND OF THE INVENTION

1. Field of the Invention

The present invention generally relates to the field of devices for preventing a wounded or convalescing dog, cat, or other animal from injuring itself. More particularly, the present invention relates to a protective collar or neck brace which prevents the animal from biting or licking the affected wounded areas of its body.

2. Description of the Prior Art

Generally, domesticated animals such as household pets are likely to lick or bite at surgical areas after receiving treatment for wounds, sores, rashes, flea bites and other afflicted areas of their bodies. Therefore, unless the animal is prevented from licking or biting the affected wounded area, the healing process will be prolonged and may lead to complications which require further medical attention.

The following five (5) prior art patents were uncovered in the pertinent field of the present invention:

1. U.S. Pat. No. 439,598 issued to Huntoon et al. on Oct. 28, 1890 for "Horse Neck Poke" (hereafter "the Huntoon patent");
2. U.S. Pat. No. 1,456,706 issued to Murray on May 29, 1923 for "Sheep Protector" (hereafter "the Murray patent");
3. U.S. Pat. No. 4,719,876 issued to Wilken on Jan. 19, 1988 for "Restraint Collar" (hereafter "the Wilken patent");
4. U.S. Pat. No. 4,286,547 issued to Newbauer et al. on Sep. 1, 1981 for "Animal Restraint Unit" (hereafter "the Newbauer patent"); and
5. U.S. Pat. No. 5,307,764 issued to Moy on May 3, 1994 for "Protective Pet Collar" (hereafter "the Moy patent").

The Huntoon patent discloses a horse neck poke which comprises an upper horizontal strap, a lower horizontal strap and a plurality of parallel vertical rods. The plurality of parallel vertical rods are attached to the upper and lower straps to form a neck brace or collar. Each individual vertical rod is permanently affixed and the rods are spaced apart so as not to touch each other.

The Murray patent discloses a sheep protector. It comprises a pair of side members, where each member has upper and lower transverse plates and curved plates connected to the upper and lower transverse plates. Each of the curved plates is longitudinally and centrally channeled, and where a spring is disposed in each channel and secured at the end to one plate. The springs are utilized for permitting easy sliding movement of the curved plates while the sheep moves its head.

The Wilken patent discloses a restraint collar for restricting the movement of an animal's head. It comprises a pliable and thickened elongated pad which is placed around the animal's neck between the shoulder and the base of the head. The opposite ends of the pad provide a releasable closure for securing the collar about the animal's neck. The closure comprises a hook and pile fastener joining the ends longitudinally and transversely to prevent inadvertent detachment of overlapped ends.

The Newbauer patent discloses an animal restraint unit. It comprises a collar, a waistband and a pair of rectilinear lateral pieces pivotally and releasably connected to the collar and the waistband.

The Moy patent discloses a protective pet collar. It comprises a sheet of hard, flexible material which is formed around an animal's neck to prevent the animal from bending its neck so as to bite or lick an affected wounded area on its body. The Moy device is not adjustable to fit different lengths of the animal's neck.

None of these prior art patents have disclosed a protective pet collar which is designed and constructed for varying the width of the protective pet collar so that only one protective pet collar will be needed to fit any length of an animal's neck, thereby eliminating the need for a plurality of protective pet collars each having a specific width to fit the particular length of the animal's neck. It is therefore highly desirable to have a very efficient and also very effective design and construction of a protective pet collar which can be adapted to any animal's neck size.

SUMMARY OF THE INVENTION

The present invention is a novel and unique protective pet collar for preventing an animal from biting or licking the affected injured areas of its body. The uniqueness of the present invention protective pet collar is its adjustable width so that the pet collar can be easily adjusted to accommodate different sizes of animals' necks, thereby allowing only one single protective pet collar to be manufactured instead of a plurality of different collars having different widths as evidenced by the prior art.

The object of the present invention is to provide a protective pet collar that can easily be adjusted to accommodate different lengths of the animal's neck. The protective pet collar comprises at least two elongated sheets of hard, but flexible material attached in parallel to one another by VELCRO® fasteners, snap fasteners or other suitable means, thereby permitting the width of the pet collar to be adjusted to accommodate different lengths of the animal's neck.

The protective pet collar is placed around the animal's neck to form a cylindrical or tubular shaped collar. VELCRO® or other fasteners are provided for retaining the pet collar in the tubular shape. The animal experiences some discomfort from this and the discomfort increases as its head swings further toward its body. The collar substantially prevents the animal from bending its neck further, and thereby prevents the animal from biting or licking a wound on its body. The stiffness of the collar (i.e., its resistance to deformation as the animal attempts to bend its neck) is largely attributable to the fact that it is formed into a tubular shape. When the animal is wearing the collar, the curve of the collar increases the rigidity of its edges, thereby inducing the discomfort which deters the animal from attempting to bend its neck.

It has been discovered, according to the present invention, that by providing a protective pet collar having an adjustable width to accommodate different lengths of an animal's neck, it will eliminate the need for a plurality of different size pet collars to accommodate the varying neck sizes of animals.

It is therefore an object of the present invention to provide a protective pet collar having an adjustable width to accommodate different sized animal necks, thereby eliminating the need for exact fitting pet collars to accommodate varying neck sizes of animals.

It is an additional object of the present invention to provide a protective pet collar having fastener means so that the width of the pet collar can easily be adjusted to accommodate different sized animal necks.

In the preferred embodiment of the present invention, the protective pet collar comprises at least two parallel sheets of hard, but flexible material attached together by VELCRO® or other fasteners such that the width of the pet collar is easily adjusted to accommodate different sized animal necks.

In an alternative embodiment of the present invention, the protective pet collar comprises at least two parallel sheets of hard, but flexible material attached together by a system which comprises a plurality of parallel rows of small apertures on one of the at least two parallel sheets and at least one row of small apertures on the other one of the at least two parallel sheets, where the one row of small apertures on each one of the at least two parallel sheets are aligned with one another and held together by snap fasteners.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is an exploded top plan view of the preferred embodiment of the present invention protective pet collar;

FIG. 3 is a top plan view of the present invention protective pet collar, showing the two sheets attached together;

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
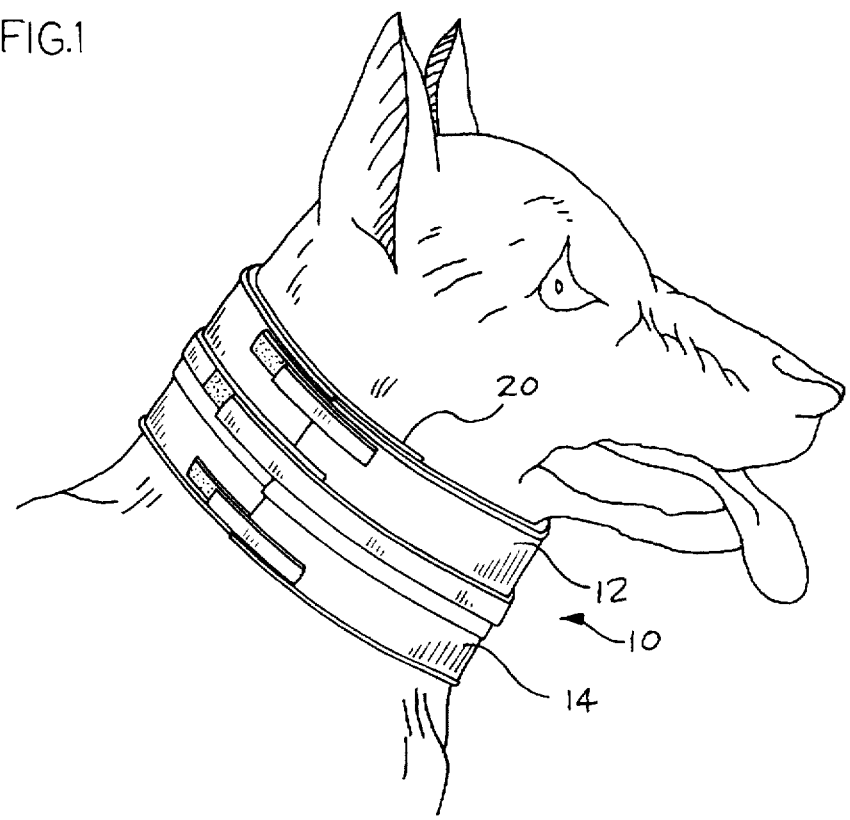
FIG. 1 is an illustration of the present invention protective pet collar as worn by a dog.

Referring to FIG. 1, there is illustrated the present invention protective pet collar 10 as worn on a dog's neck. The protective pet collar 10 comprises an elongated rectangular shaped upper sheet 12 and an elongated rectangular shaped lower sheet 14 that are of hard, but flexible material made of low density polyethylene or other suitable material. Pressed against the underside of the protective collar 10 is a foam pad (not shown) which may make the collar somewhat more comfortable when it is being worn by the animal. The two sheets and foam pad may be enclosed by a fabric (not shown). It is to be understood that the foam pad and fabric are optional and not at all essential to the present invention.

Referring to FIG. 2, there is shown at 10 an exploded top plan view of the preferred embodiment of the present invention protective pet collar. Each of the two sheets 12 and 14 has a front side 16, a back side 18, a distal edge 20 and a proximal edge 22. The distal edges 20 are provided with edge covers 23. What is unique about the present invention protective pet collar 10 is that it has an adjustable width. The adjustable width of the protective pet collar 10 is comprised of a system that includes a rectangular shaped main female fastener 24 (shown in dashed lines), two opposite small female fasteners 26 and 28 (shown in dashed lines), a complementary rectangular shaped main male fastener 30 and two complementary small male fasteners 32 and 34. The main female fastener 24 is attached to the back side 18 of the upper sheet 12. The two small female fasteners 26 and 28 are attached to the back side 18 of the upper sheet 12 at opposite ends. The main male fastener 30 is attached to the front side 16 of the lower sheet 14. The two male fasteners 32 and 34 are attached to the front side 16 of the lower sheet 14 at opposite ends.

The protective pet collar 10 is also provided with five male and female fasteners 36, 38, 40, 42 and 44 which are utilized for maintaining the collar in a tubular or cylindrical shape body. The female fasteners 36 and 40 are attached to the front and back sides of the two sheets 12 and 14 respectively and located adjacent to the distal edges 20. The mating surfaces of the female fasteners 36 and 40 are faced downward and extend outwardly from ends of the two sheets 12 and 14 as shown. The male fasteners 38 and 42 are attached to the front and back sides 16 and 18 of the two sheets 12 and 14 respectively and opposite to the female fasteners 36 and 38. The mating surfaces of male fasteners 38 and 42 are faced upward as shown. The fastener 44 has a male mating side 46 which faces down and a female mating side 48 which faces up so that when the collar 10 forms into the tubular shaped body and encloses the dog's neck, the fastener 44 stretches in the longitudinal direction such that the male mating side 46 connects to the female mating side 48 (see FIGS. 2 and 3).

Figure 4:
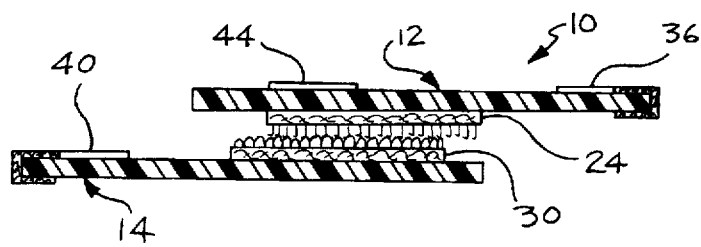
FIG. 4 is an enlarged cross-sectional view taken along line 4—4 of FIG. 3.

FIG. 3 shows a top plan view of the protective pet collar 10. FIG. 4 shows a cross-sectional view of the protective pet collar 10. Referring to FIGS. 3 and 4, the two sheets 12 and 14 are attached together by the fasteners and overlapping one another to form the protective pet collar. The width W of the protective pet collar 10 can easily be adjusted by detaching the two sheets 12 and 14 from one another and repositioning the two sheets 12 and 14 together to form a different width W for a different length of the animal's neck by adjusting the amount of overlap of the fasteners. The width W of the collar 10 (the axial length of the collar) is correlated with the length of the animal's neck, so that the distal edges 20 of the collar 10 press on the animal's neck when it attempts to turn its head. The animal experiences some discomfort from this, the discomfort increasing as its head swings further toward its body. Ultimately, the collar 10 prevents the animal from bending its neck further, well before it is able to make contact between its mouth or tongue and its body. The curvature of the collar 10 when worn by the animal increases the rigidity of its edges and thereby produces the discomfort which deters the animal from attempting to bend its neck.

The correct width W of the protective collar 10 depends on the size of the animal's neck. For most dogs, W may be in the range of approximately 2 to 4 inches; for most cats, W may be in the range of approximately 1 to 1½ inches. Preferably, the protective collar 10 should extend substantially between the animal's scapula (shoulder blade) at the lower edge and its mandible (low jaw) and atlas vertebra at the upper edge, and thereby the animal's entire neck should be enclosed. The length L of the collar 10 and the placement of VELCRO® fasteners should be such that the collar 10 fits snugly on the animal's neck but does not create discomfort unless the animal attempts to turn its head.

Referring to FIG. 1, as the dog attempts to bend its neck, the distal edges 20 of the upper sheet 12 of the protective collar 10 press on its skin, creating a certain amount of discomfort or minor pain and deterring the dog from bending its neck further. If the dog continues to bend its neck further, eventually the collar 10 will prevent the dog from any further bending movement.

With the present invention protective pet collar 10, the animal is free to drink, eat and sleep without extreme hindrance or discomfort. In addition, the animal can walk, run and otherwise engage in most of its regular activities, the only restriction being on its ability to turn its head so as to bring its mouth or tongue in contact with its body.

It will be appreciated that the present invention protective pet collar is not limited to a dog as illustrated in FIG. 1. It is within the spirit and scope of the present invention to be suitable for use with cats and other household pets, as well as any animal whose head needs to be restrained in order to prevent it from injuring itself. The VELCRO® fasteners in the embodiments may be replaced by buckles, tie strings, spring clips, snap buttons or any other type of fastener means.

The male and female fasteners of the present invention are made of hook and loop VELCRO®0 fasteners. Each hook and loop fastener has a thin backing which has a front surface and an opposite back surface. There are usually no functional structures on the back surface of a hook and loop fastener. The functional mating surface of the hook and loop fastener is carried on its front surface. The front surface of each male fastener is a hook type mating surface which has a large amount of filamentary hook members, and the front surface of each female fastener is a loop type mating surface which has a large amount of filamentary loop members. When the female and male hook and loop fasteners are attached to the two sheets 12 and 14 respectively, it is their non-functional back surfaces which are brought into contact with the two sheets. One of the preferred methods of attachment to the two sheets is by stitching means. The stitching lines stitch the thin backing of the female and male fasteners onto the designated sides of the two sheets respectively.

The present invention has one advantageous feature over prior art protective pet collars in that it can easily be adjusted to different widths to accommodate different animals' neck sizes.

The alternative embodiment of the present invention is very similar to the preferred embodiment discussed and the only difference is in the nature of the configuration and how the two sheets 112 and 114 are attached together. All of the parts of the alternative embodiment protective pet collar 110 are numbered correspondingly with 100 added to each number. The fasteners 136, 138, 140, 142 and 144 are identical to and function the same as the fasteners 36, 38, 40, 42 and 44 described in FIGS. 1 through 4, and the description thereof will be repeated.

Figure 5:
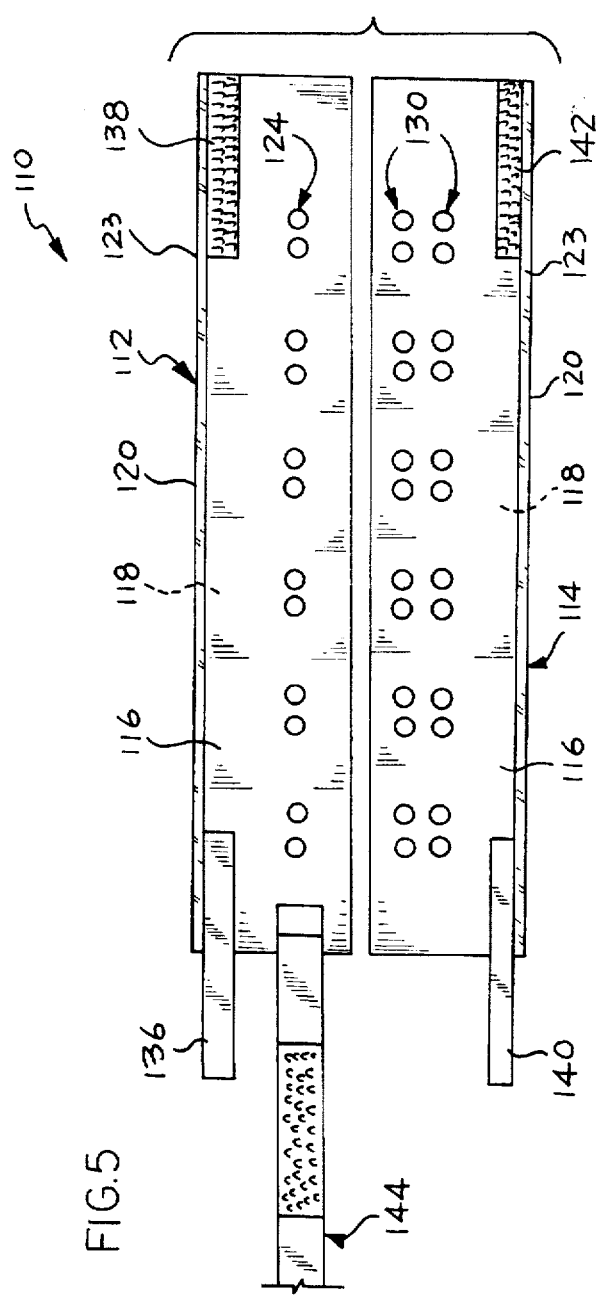
FIG. 5 is an exploded top plan view of an alternative embodiment of the present invention protective pet collar.

Referring to FIG. 5, there is shown at 110 an exploded top plan view of the present invention protective pet collar. The protective pet collar 110 comprises an elongated rectangular shaped upper sheet 112 and an elongated rectangular shaped lower sheet 114 that are of hard, but flexible material made of low density polyethylene or other suitable material.

Each of the two sheets 112 and 114 has a front side 116, a back side 118, a distal edge 120 and a proximal edge 122. The distal edges 120 are provided with edge covers 123. The present invention protective pet collar 110 has an adjustable width W. The adjustable width W of the protective pet collar 110 comprises a system that has at least one row of small apertures 124 on the upper sheet 112 and at least two parallel rows of small apertures 130 on the lower sheet 114.

Figure 7:
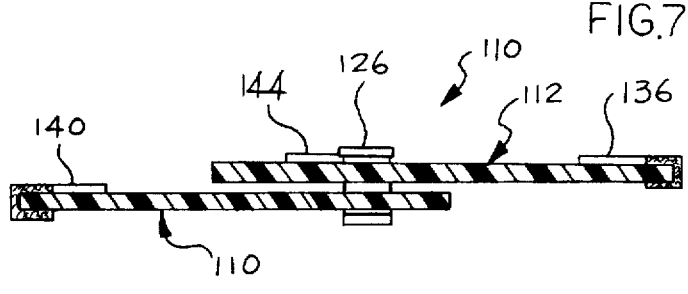
FIG. 7 is an enlarged cross-sectional view taken along line 7—7 of FIG. 6.
Figure 8:
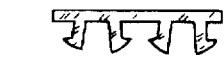
FIG. 8 is a side elevational view of a snap fastener means of the present invention protective pet collar.
Figure 6:
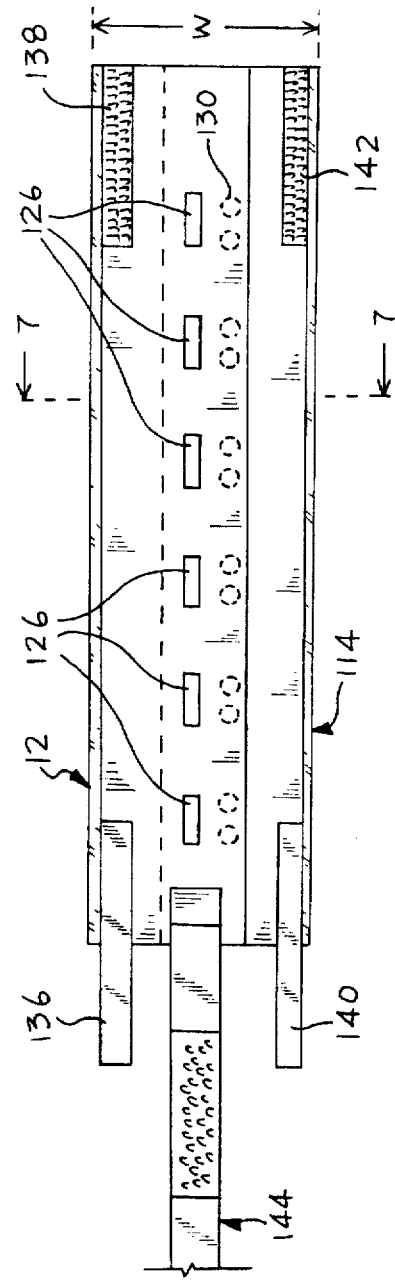
FIG. 6 is a top plan view of the present invention protective pet collar, showing the two sheets attached together.

Referring to FIGS. 6, 7 and 8, the two sheets 112 and 114 are attached together and overlapping one another to form the protective pet collar 110. The width W of the protective pet collar 110 can easily be adjusted by aligning the at least one row of small apertures 124 on the upper sheet 112 to one of the at least two parallel rows of small apertures 130 on the lower sheet 114. The two sheets 112 and 114 are held together by snapping in a plurality of snap fasteners 126 (only one is shown in FIG. 8) into the small apertures 124 and 130 respectively as shown in FIG. 6. In this embodiment, the width W of the collar 110 can be adjusted in only two different widths to accommodate two different animals having necks of different lengths.

It will be appreciated that although the upper sheet 112 is shown with only one row of small apertures 124 and the lower sheet 114 is shown with two parallel rows of small apertures 130, it is also within the spirit and scope of the present invention to have a plurality of parallel rows of small apertures on each one of the two sheets 112 and 114 respectively to have a plurality of different widths for the protective pet collar 110.

Defined in detail, the present invention is a protective collar for an animal, comprising: (a) two elongated sheets of hard, flexible material each having a back side, a front side, an elongated distal edge, an elongated proximal edge and two opposite ends; (b) means for adjustably attaching the two sheets together in parallel such that the proximal edges are located adjacent to each other and forming the protective collar with an adjustable width to accommodate different sizes of an animal's neck; and (c) fastener means respectively positioned adjacent to the distal edges of the two sheets and located at the two opposite ends for adjustably fastening the two opposite ends of the two sheets to form a tubular shaped protective collar around the animal's neck; (d) whereby when the tubular shaped protective collar is formed around the animal's neck, the collar thereby substantially prevents the animal from bending its neck to bite or lick an affected area on its body.

Defined broadly, the present invention is a collar for an animal, comprising: (a) two sheets of hard, flexible material; (b) means for adjustably attaching the two sheets together in parallel to form the collar with an adjustable width to accommodate different lengths of an animal's neck; and (c) means for adjustably fastening the two sheets to form a tubular shaped collar around the animal's neck; (d) whereby, when the tubular shaped collar is formed around the animal's neck, the collar thereby substantially prevents the animal from bending its neck to bite or lick an affected area on its body.

Defined more broadly, the present invention is a collar for an animal, comprising: (a) at least two sheets of flexible material; (b) means for adjustably attaching the at least two sheets together to form the collar with an adjustable width to accommodate the length of the animal's neck; and (c) means for adjustably fastening the at least two sheets to enclose the animal's neck; (d) whereby when the at least two sheets encloses the animal's neck, the collar thereby substantially inhibits the animal from bending its neck.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A protective collar for an animal, comprising:
   a. two elongated sheets of hard, flexible material each having a back side, a front side, an elongated distal edge, an elongated proximal edge and two opposite ends;
   b. means for adjustably attaching said two sheets together in parallel such that said proximal edges are located adjacent to each other and forming the protective collar with an adjustable width to accommodate different sizes of an animal's neck, wherein said means for adjustably attaching comprises a plurality of first fasteners attached to said back side of one of said two sheets and a plurality of complementary second fasteners attached to said front side of the other one of said two sheets and facing the plurality of first fasteners respectively, where each one of said plurality of first fasteners is a male fastener with a hook type surface and each one of said plurality of complementary second fasteners is a female fastener with a loop type surface; and
   c. fastener means respectively positioned adjacent to said distal edges of said two sheets and located at said two opposite ends for adjustably fastening said two opposite ends of said two sheets to form a tubular shaped protective collar around the animal's neck;
   d. whereby when said tubular shaped protective collar is formed around the animal's neck, the collar thereby substantially prevents the animal from bending its neck to bite or lick an affected area on its body.

2. A collar for an animal, comprising:
   a. two sheets of hard, flexible material;
   b. means for adjustably attaching said two sheets together in parallel to form the collar with an adjustable width to accommodate different lengths of an animal's neck, wherein said means for adjustably attaching comprises a plurality of first fasteners attached to one of said two sheets and a plurality of complementary second fasteners attached to the other one of said two sheets and facing the plurality of first fasteners respectively, where each one of said plurality of first fasteners is a male fastener with a hook type surface and each one of said plurality of complementary second fasteners is a female fastener with a loop type surface; and
   c. means for adjustably fastening said two sheets to form a tubular shaped collar around the animal's neck;
   d. whereby, when said tubular shaped collar is formed around the animal's neck, the collar thereby substantially prevents said animal from bending its neck to bite or lick an affected area on its body.

3. The collar in accordance with claim 2 wherein said means for adjustably fastening comprises at least one pair of fasteners.

4. The collar in accordance with claim 3 wherein said at least one pair of fasteners comprises a male fastener with a hook type surface and a complementary female fastener with a loop type surface.

5. The collar in accordance with claim 3 wherein said at least one pair of fasteners comprises a male snap fastener and a complementary female snap fastener.

6. The collar in accordance with claim 2 wherein the collar is intended for a dog.

7. The collar in accordance with claim 2 wherein the collar is intended for a cat.

8. A collar for an animal, comprising:
   a. at least two sheets of flexible material;
   b. means for adjustably attaching said at least two sheets together to form said collar with an adjustable width to accommodate the length of the animal's neck, wherein said means for adjustably attaching comprises at least one first fastener attached to one of said at least two sheets and at least one complementary second fastener attached to the other one of said at least two sheets and facing the at least one first fastener, where said at least one first fastener is a male fastener with a hook type surface and said at least one complementary second fastener is a female fastener with a loop type surface; and
   c. means for adjustably fastening said at least two sheets to enclose the animal's neck;
   d. whereby when said at least two sheets encloses the animal's neck, the collar thereby substantially inhibits the animal from bending its neck.

9. The collar in accordance with claim 8 wherein said means for adjustably fastening comprises at least one pair of fasteners.

10. The collar in accordance with claim 9 wherein said at least one pair of fasteners comprises a male fastener with a hook type surface and a complementary female fastener with a loop type surface.

11. The collar in accordance with claim 9 wherein said at least one pair of fasteners comprises a male snap fastener and a complementary female snap fastener.

12. The collar in accordance with claim 8 wherein the collar is intended for a dog.

13. The collar in accordance with claim 8 wherein the collar is intended for a cat.

14. A protective collar for an animal, comprising:
   a. two elongated sheets of hard, flexible material each having a back side, a front side, an elongated distal edge, an elongated proximal edge and two opposite ends;
   b. means for adjustably attaching said two sheets together in parallel such that said proximal edges are located adjacent to each other and forming the protective collar with an adjustable width to accommodate different sizes of an animal's neck, wherein said means for adjustably attaching comprises a plurality of first fasteners attached to said back side of one of said two sheets and a plurality of complementary second fasteners attached to said front side of the other one of said two sheets and facing the plurality of first fasteners respectively, where each one of said plurality of first fasteners is a female fastener with a loop type surface and each one of said plurality of complementary second fasteners is a male fastener with a hook type surface; and c. fastener means respectively positioned adjacent to said distal edges of said two sheets and located at said two opposite ends for adjustably fastening said two opposite ends of said two sheets to form a tubular shaped protective collar around the animal's neck;

d. whereby when said tubular shaped protective collar is formed around the animal's neck, the collar thereby substantially prevents the animal from bending its neck to bite or lick an affected area on its body.

15. A protective collar for an animal, comprising:

a. two elongated sheets of hard, flexible material each having a back side, a front side, an elongated distal edge, an elongated proximal edge and two opposite ends;

b. means for adjustably attaching said two sheets together in parallel such that said proximal edges are located adjacent to each other and forming the protective collar with an adjustable width to accommodate different sizes of an animal's neck, wherein said means for adjustably attaching comprises a plurality of parallel rows of small apertures on one of said two sheets and at least one row of small apertures on the other one of said two sheets, where the at least one row of small apertures on the other one of said two sheets are respectively aligned with one of the plurality of parallel rows of small apertures on the one of said two sheets and held together by a plurality of snap fasteners; and c. fastener means respectively positioned adjacent to said distal edges of said two sheets and located at said two opposite ends for adjustably fastening said two opposite ends of said two sheets to form a tubular shaped protective collar around the animal's neck;

d. whereby when said tubular shaped protective collar is formed around the anima's neck, the collar thereby substantially prevents the animal from bending its neck to bite or lick an affected area on its body.

16. A collar for an animal, comprising:

a. two sheets of hard, flexible material;

b. means for adjustably attaching said two sheets together in parallel to form the collar with an adjustable width to accommodate different lengths of an animal's neck, wherein said means for adjustably attaching comprises a plurality of parallel rows of small apertures on one of said two sheets and at least one row of small apertures on the other one of said two sheets, where the at least one row of small apertures on the other one of said two sheets are respectively aligned with one of the plurality of parallel rows of small apertures on the one of said two sheets and held together by a plurality of snap fasteners; and c. means for adjustably fastening said two sheets to form a tubular shaped collar around the animal's neck;

d. whereby, when said tubular shaped collar is formed around the animal's neck, the collar thereby substantially prevents said animal from bending its neck to bite or lick an affected area on its body.

17. The collar in accordance with claim 16 wherein said means for adjustably fastening comprises at least one pair of fasteners.

18. The collar in accordance with claim 17 wherein said at least one pair of fasteners comprises a male fastener with a hook type surface and a complementary female fastener with a loop type surface.

19. The collar in accordance with claim 17 wherein said at least one pair of fasteners comprises a male snap fastener and a complementary female snap fastener.

20. The collar in accordance with claim 16 wherein the collar is intended for a dog.

21. The collar in accordance with claim 16 wherein the collar is intended for a cat.

22. A collar for an animal, comprising:

a. at least two sheets of flexible material;

b. means for adjustably attaching said at least two sheets together to form said collar with an adjustable width to accommodate the length of the animal's neck, wherein said means for adjustably attaching comprises at least two rows of small apertures on one of said at least two sheets and at least one row of small apertures on the other one of said at least two sheets, where the at least one row of small apertures on the other one of said at least two sheets are respectively aligned with one of the at least two rows of small apertures on the one of said at least two sheets and held together by a plurality of snap fasteners; and c. means for adjustably fastening said at least two sheets to enclose the animal's neck;

d. whereby when said at least two sheets encloses the animal's neck, the collar thereby substantially inhibits the animal from bending its neck.

23. The collar in accordance with claim 22 wherein said means for adjustably fastening comprises at least one pair of fasteners.

24. The collar in accordance with claim 23 wherein said at least one pair of fasteners comprises a male fastener with a hook type surface and a complementary female fastener with a loop type surface.

25. The collar in accordance with claim 23 wherein said at least one pair of fasteners comprises a male snap fastener and a complementary female snap fastener.

26. The collar in accordance with claim 22 wherein the collar is intended for a dog.

27. The collar in accordance with claim 22 wherein the collar is intended for a cat.

* * * * *